(12) United States Patent
Sukhomlinov et al.

(10) Patent No.: US 11,388,272 B2
(45) Date of Patent: Jul. 12, 2022

(54) TECHNOLOGIES FOR NETWORK PACKET PROCESSING BETWEEN CLOUD AND TELECOMMUNICATIONS NETWORKS

(71) Applicant: Intel Corporation, Santa Clara, CA (US)

(72) Inventors: Vadim Sukhomlinov, Santa Clara, CA (US); Kshitij Doshi, Tempe, AZ (US); Areg Melik-Adamyan, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 837 days.

(21) Appl. No.: 15/942,012

(22) Filed: Mar. 30, 2018

(65) Prior Publication Data

US 2019/0045037 A1 Feb. 7, 2019

(51) Int. Cl.
| | |
|---|---|
| *H04L 29/08* | (2006.01) |
| *H04L 29/06* | (2006.01) |
| *H04L 69/321* | (2022.01) |
| *H04L 12/46* | (2006.01) |
| *G06F 9/54* | (2006.01) |
| *H04L 67/59* | (2022.01) |
| *H04L 69/22* | (2022.01) |
| *H04L 67/10* | (2022.01) |
| *H04L 67/133* | (2022.01) |

(52) U.S. Cl.
CPC ............ *H04L 69/321* (2013.01); *G06F 9/547* (2013.01); *H04L 12/4633* (2013.01); *H04L 12/4641* (2013.01); *H04L 29/08846* (2013.01); *H04L 67/10* (2013.01); *H04L 67/40* (2013.01); *H04L 69/22* (2013.01); *H04L 2212/00* (2013.01)

(58) Field of Classification Search
CPC ............. H04L 12/4633; H04L 12/4641; H04L 29/08846; H04L 67/10; H04L 67/40; H04L 69/22; H04L 69/321; H04L 2212/00
See application file for complete search history.

(56) References Cited

U.S. PATENT DOCUMENTS

| | | | |
|---|---|---|---|
| 2017/0192811 A1* | 7/2017 | Kiess | ...................... G06F 9/541 |
| 2017/0223117 A1* | 8/2017 | Messerli | ............. H04L 12/4641 |

* cited by examiner

*Primary Examiner* — Michael Thier
*Assistant Examiner* — Prince A Mensah
(74) *Attorney, Agent, or Firm* — Essential Patents Group, LLP.; Christopher K. Gagne

(57) ABSTRACT

Technologies for network packet processing between cloud and telecommunications networks includes a network computing device which includes two application layer packet translators (ALPTs). The first ALPT is configured to receive a network packet from a computing device in a telecommunications network, identify a virtual network function (VNF) instance, and perform an application layer encapsulation of at least a portion of data of the received network packet as a parameter of a remote procedure call (RPC) associated with the identified VNF instance. The first ALPT is additionally configured to invoke the identified VNF instance using an API call corresponding to the RPC that includes the RPC parameter and the VNF instance is configured to transmit an RPC call response to the second ALPT. The second ALPT is configured to generate a new network packet as a function of the RPC call response and transmit the new network packet to another computing device in a cloud network.

25 Claims, 6 Drawing Sheets

TECHNOLOGIES FOR NETWORK PACKET PROCESSING BETWEEN CLOUD AND TELECOMMUNICATIONS NETWORKS

BACKGROUND

Network operators and telecommunication service providers typically rely on various network virtualization technologies to manage complex, large-scale computing environments, such as high-performance computing (HPC) and cloud computing environments. For example, network operators and service provider networks may rely on network function virtualization (NFV) deployments to deploy network services (e.g., firewall services, network address translation (NAT) services, load-balancing services, deep packet inspection (DPI) services, transmission control protocol (TCP) optimization services, etc.). Such NFV deployments typically use an NFV infrastructure to orchestrate various virtual machines (VMs) to perform virtualized network services, commonly referred to as virtualized network functions (VNF instances), on network traffic and to manage the network traffic across the various VMs.

Unlike traditional, non-virtualized deployments, virtualized deployments decouple network functions from underlying hardware, which results in network functions and services that are highly dynamic and generally capable of being executed on off-the-shelf servers with general purpose processors. As such, the VNF instances can be scaled-in/out as necessary based on particular functions or network services to be performed on the network traffic. However, effectively deploying and executing the VNF instances requires vendors to ensure they can achieve packet line rate (e.g., end to end across sequences of VNF instances and forwarders/routers) and work with various variations of network hardware interfaces, which requires supporting multiple network protocols, deployment topologies, and configurations. Meeting such requirements can often lead to increased production costs and hinder efficient, modular development of VNF instances.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
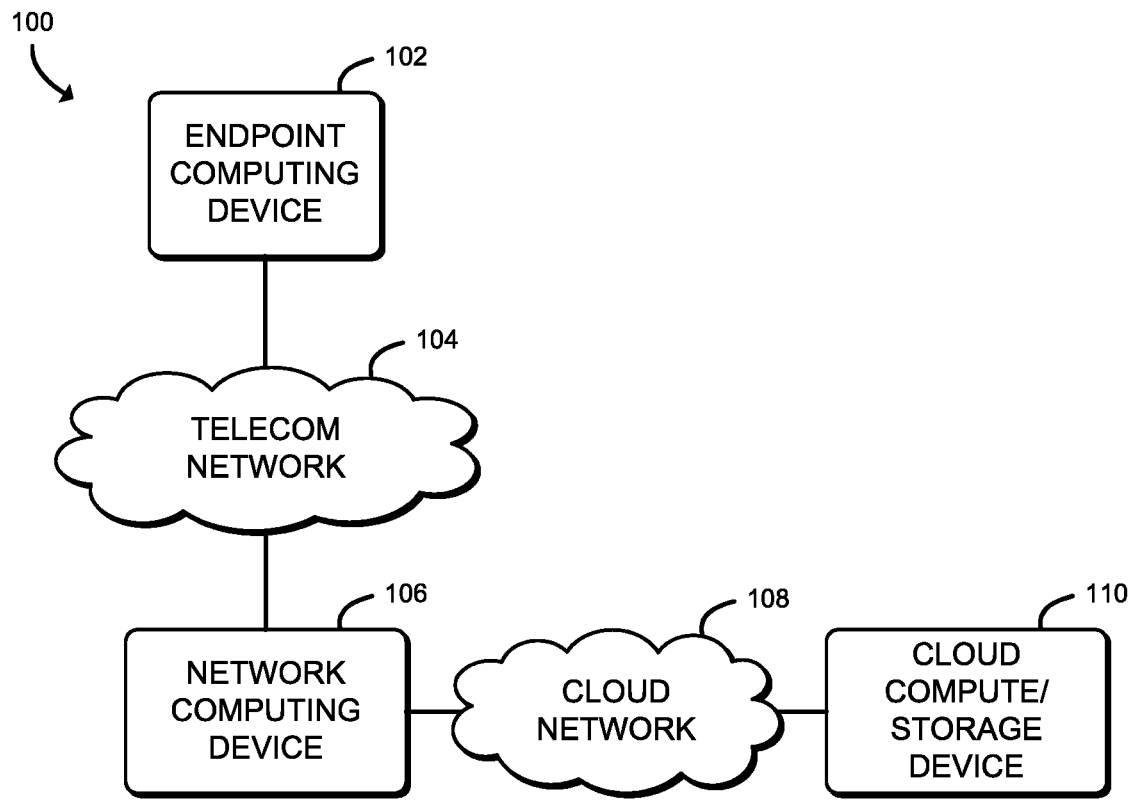
FIG. 1 is a simplified block diagram of at least one embodiment of a system for network packet processing between cloud and telecommunications networks that includes a endpoint computing device and a network computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for network packet processing between cloud and telecommunications networks includes an endpoint computing device 102 communicatively coupled to a network computing device 106 via a telecommunications network 104. While illustratively shown as having a single endpoint computing device 102 and a single network computing device 106, the system 100 may include multiple endpoint computing devices 102 and multiple network computing devices 106, in other embodiments. The illustrative system 100 additionally includes a cloud network 108 communicatively coupling the network computing device 106 to a cloud compute/storage device 110 (e.g., of a cloud service provider). In use, the endpoint computing device 102, or more particularly an application being executed thereon, transmits network packets to the network computing device 106 via the telecommunications network 104. It should be appreciated that at least a portion of the transmitted network packets include data on which one or more virtualized services (e.g., firewall services, network address translation (NAT) services, load-balancing services, deep packet inspection (DPI) services, transmission control protocol (TCP) optimization services, etc.) are to be performed on at least a portion of the network packet.

Upon receiving the network packet, the network computing device 106, or more particularly an application layer packet translator (see, e.g., the application layer packet translator of FIG. 3) of the network computing device 106, reads and classifies the received network packet based on a flow type of the network packet, such as may be determined as a function of at least a portion of the data contained in the header and/or payload of the network packet. The application layer packet translator further determines a service policy, such as may be defined in a flow database, based on the flow classification which identifies one or more virtual network function (VNF) instances that are to be invoked for the received network packet. Additionally, the application layer packet translator is configured to map the network packet to the one or more VNF instances (e.g., in a network function forwarding table). To call a VNF instance, the application layer packet translator is configured to initiate a remote procedure call (RPC) application programming interface (API) call using the applicable URI for that VNF instance. It should be appreciated that, while the network functions described are described herein as virtual (i.e., VNF instances), at least a portion of the network functions described herein may not be virtualized, in some embodiments.

When a VNF instance has completed the intended service workload, the VNF instance calls the application layer packet translator with an indication that the network packet can be processed (e.g., using a process packet call). Once the application layer packet translator receives a call to process the network packet (i.e., the process packet call), the application layer packet translator is configured to map the RPC data source associated with the process packet call to specific data of the received packet, which is to be added/modified in a header of the network packet. It should be appreciated that some VNF instances may perform some level of processing on at least a portion of the network packet data. Accordingly, such VNF instances may call the application layer packet translator with the callback as described above, or return a response with processed packet data to the application layer packet translator.

Additionally, the application layer packet translator is configured to create another network packet as a function of the header additions/modifications and applicable data (e.g., payload), and send the network packet across the cloud network (e.g., to a compute/storage device in a cloud) or to a network computing device 106 of another telecommunications provider (e.g., via another telecommunications network). It should be appreciated that, in some embodiments, the application layer packet translator may be embodied as a VNF instance itself.

returning a response with processed packet data

Figure 2:
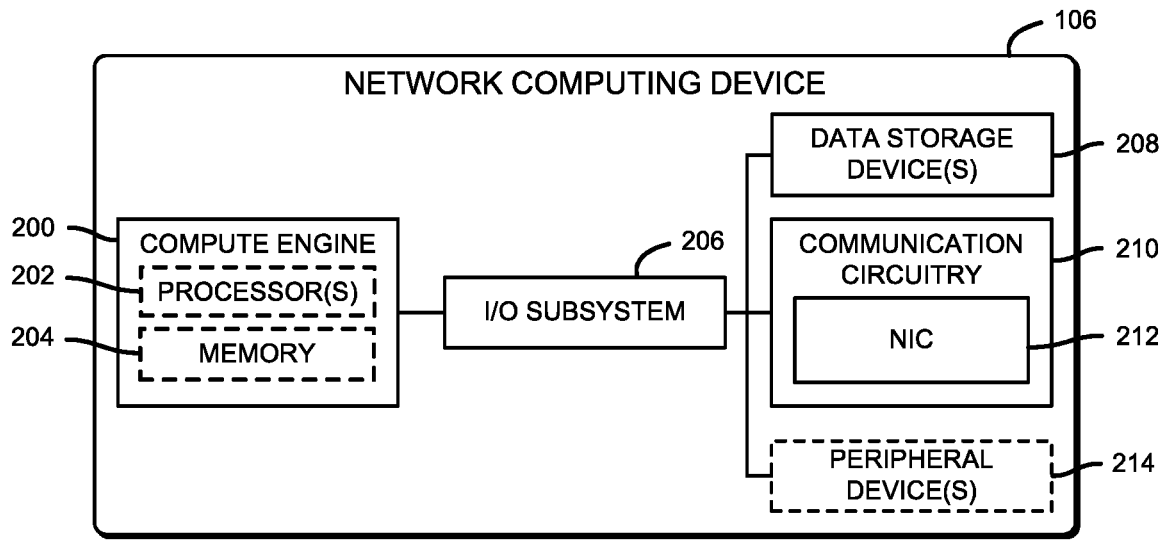
FIG. 2 is a simplified block diagram of at least one embodiment of the network computing device of the system of FIG. 1.

The network computing device 106 may be embodied as any type of computation or computer device capable of performing the functions described herein, including, without limitation, a server (e.g., stand-alone, rack-mounted, blade, etc.), a sled (e.g., a compute sled, an accelerator sled, a storage sled, a memory sled, etc.), an enhanced network interface controller (NIC) (e.g., a host fabric interface (HFI)), a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a gateway, a web appliance, a distributed computing system, a processor-based system, and/or a multiprocessor system. Referring now to FIG. 2, the illustrative network computing device 106 includes a compute engine 200, an I/O subsystem 206, one or more data storage devices 208, communication circuitry 210, and, in some embodiments, one or more peripheral devices 214. It should be appreciated that the network computing device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 200 may be embodied as any type of device or collection of devices capable of performing the various compute functions as described herein. In some embodiments, the compute engine 200 may be embodied as a single device, such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 200 may include, or may be embodied as, one or more processors 202 (i.e., one or more central processing units (CPUs)) and memory 204.

The processor(s) 202 may be embodied as any type of processor capable of performing the functions described herein. For example, the processor(s) 202 may be embodied as one or more single-core processors, one or more multi-core processors, a digital signal processor, a microcontroller, or other processor or processing/controlling circuit(s). In some embodiments, the processor(s) 202 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The memory 204 may be embodied as any type of volatile (e.g., dynamic random access memory (DRAM), etc.) or non-volatile memory or data storage capable of performing the functions described herein. It should be appreciated that the memory 204 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 200 is communicatively coupled to other components of the network computing device 106 via the I/O subsystem 206, which may be embodied as circuitry and/or components to facilitate input/output operations with the processor 202, the memory 204, and other components of the network computing device 106. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with the compute engine 200 (e.g., the processor 202, the memory 204, etc.) and/or other components of the network computing device 106, on a single integrated circuit chip.

The one or more data storage devices 208 may be embodied as any type of storage device(s) configured for short-term or long-term storage of data, such as, for example, memory devices and circuits, memory cards, hard disk drives, solid-state drives, or other data storage devices. Each data storage device 208 may include a system partition that stores data and firmware code for the data storage device 208. Each data storage device 208 may also include an operating system partition that stores data files and executables for an operating system.

The communication circuitry 210 may be embodied as any communication circuit, device, or collection thereof, capable of enabling communications between the network computing device 106 and other computing devices, such as the endpoint computing device 102, as well as any network communication enabling devices, such as a gateway, an access point, network switch/router, etc., to allow communication over the telecommunications network 104. Accordingly, the communication circuitry 210 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 210 may include specialized circuitry, hardware, or combination thereof to perform pipeline logic (e.g., hardware algorithms) for performing the functions described herein, including applying the hash functions, processing network packets (e.g., parse received network packets, determine destination computing devices for each received network packets, forward the network packets to a particular buffer queue of a respective host buffer of the network computing device 106, etc.), performing computational functions, etc.

In some embodiments, performance of one or more of the functions of communication circuitry 210 as described herein may be performed by specialized circuitry, hardware, or combination thereof of the communication circuitry 210, which may be embodied as a system-on-a-chip (SoC) or otherwise form a portion of a SoC of the network computing device 106 (e.g., incorporated on a single integrated circuit chip along with a processor 202, the memory 204, and/or other components of the network computing device 106). Alternatively, in some embodiments, the specialized circuitry, hardware, or combination thereof may be embodied as one or more discrete processing units of the network computing device 106, each of which may be capable of performing one or more of the functions described herein.

The illustrative communication circuitry 210 includes a MC 212, which may also be referred to as an HFI in some embodiments (e.g., high-performance computing (HPC) environments). The NIC 212 may be embodied as one or more add-in-boards, daughtercards, network interface cards, controller chips, chipsets, or other devices that may be used by the network computing device 106 to connect with another compute device (e.g., the endpoint computing device 102). In some embodiments, the NIC 212 may be embodied as part of a system-on-a-chip (SoC) that includes one or more processors, or included on a multichip package that also contains one or more processors. In some embodiments, the NIC 212 may include a local processor (not shown) and/or a local memory (not shown) that are both local to the NIC 212. In such embodiments, the local processor of the MC 212 may be capable of performing one or more of the functions of a processor 202 described herein. Additionally or alternatively, in such embodiments, the local memory of the NIC 212 may be integrated into one or more components of the network computing device 106 at the board level, socket level, chip level, and/or other levels.

The one or more peripheral devices 214 may include any type of device that is usable to input information into the network computing device 106 and/or receive information from the network computing device 106. The peripheral devices 214 may be embodied as any auxiliary device usable to input information into the network computing device 106, such as a keyboard, a mouse, a microphone, a barcode reader, an image scanner, etc., or output information from the network computing device 106, such as a display, a speaker, graphics circuitry, a printer, a projector, etc. It should be appreciated that, in some embodiments, one or more of the peripheral devices 214 may function as both an input device and an output device (e.g., a touchscreen display, a digitizer on top of a display screen, etc.). It should be further appreciated that the types of peripheral devices 214 connected to the network computing device 106 may depend on, for example, the type and/or intended use of the network computing device 106. Additionally or alternatively, in some embodiments, the peripheral devices 214 may include one or more ports, such as a USB port, for example, for connecting external peripheral devices to the network computing device 106.

Referring back to FIG. 1, the endpoint computing device 102 may be embodied as any type of computation or computer device capable of performing the functions described herein, including, without limitation, a mobile computing device (e.g., a smartphone, a tablet computer, a laptop computer, a notebook computer, a wearable, etc.), a desktop computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, and/or a multiprocessor system. While not illustratively shown, it should be appreciated that the endpoint computing device 102 includes similar and/or like components to those of the illustrative network computing device 106. As such, figures and descriptions of the like components are not repeated herein for clarity of the description with the understanding that the description of the corresponding components provided above in regard to the network computing device 106 applies equally to the corresponding components of the endpoint computing device 102.

Similar to the network computing device 106, the cloud compute/storage device 110 may be embodied as any type of computation or computer device capable of performing the functions described herein, including, without limitation, a server (e.g., stand-alone, rack-mounted, blade, etc.), a sled (e.g., a compute sled, an accelerator sled, a storage sled, a memory sled, etc.), an enhanced NIC (e.g., an HFI)), a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system. While not illustratively shown, it should be appreciated that the cloud compute/storage device 110 includes similar and/or like components to those of the illustrative network computing device 106. As such, figures and descriptions of the like components are not repeated herein for clarity of the description with the understanding that the description of the corresponding components provided above in regard to the network computing device 106 applies equally to the corresponding components of the cloud compute/storage device 110.

The telecommunications network 104 may be embodied as any type of wired or wireless communication network, including but not limited to a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a wireless local area network (WLAN), a wireless personal area network (WPAN), a global network (e.g., the Internet), or any combination thereof. It should be appreciated that, in such embodiments, the telecommunications network 104 may serve as a centralized network and, in some embodiments, may be communicatively coupled to another network (e.g., the Internet). Accordingly, the telecommunications network 104 may include a variety of other virtual and/or physical network computing devices (e.g., gateways, access points, routers, switches, network hubs, servers, storage devices, compute devices, etc.), as needed to facilitate communication between the endpoint computing device 102 and the network computing device 106, which are not shown to preserve clarity of the description.

The cloud network 108 may be embodied as any type of wired or wireless communication network within or that otherwise enables a cloud computing infrastructure (i.e., a cloud based network or a cloud enabled network). Similar to the telecommunications network 104, it should be appreciated that, the cloud network 108 may serve as a centralized network and, in some embodiments, may be communicatively coupled to another network (e.g., the Internet). Accordingly, the cloud network 108 may include a variety of other virtual and/or physical network computing devices (e.g., gateways, access points, routers, switches, network hubs, servers, storage devices, compute devices, etc.), as needed to facilitate communication between the network computing device 106 and the cloud compute/storage device 110, which are not shown to preserve clarity of the description.

Figure 3:
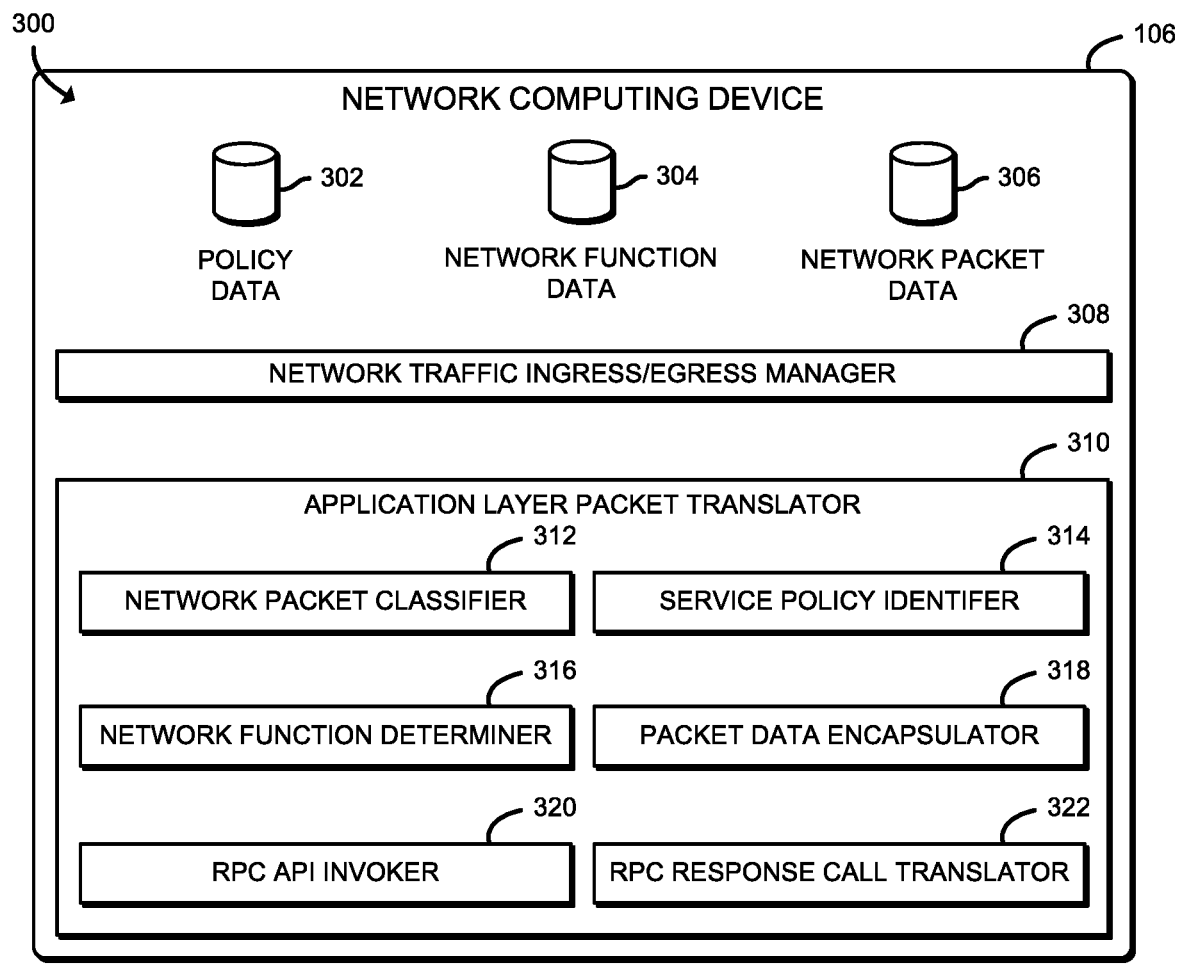
FIG. 3 is a simplified block diagram of at least one embodiment of an environment of the network computing device of the system of FIG. 1.

Referring now to FIG. 3, in use, the network computing device 106 establishes an environment 300 during operation. The illustrative environment 300 includes a network traffic ingress/egress manager 308 and an application layer packet translator 310. The various components of the environment 300 may be embodied as hardware, firmware, software, or a combination thereof. As such, in some embodiments, one or more of the components of the environment 300 may be embodied as circuitry or collection of electrical devices (e.g., network traffic ingress/egress management circuitry 308, application layer packet translation circuitry 310, etc.).

It should be appreciated that, while not illustratively shown, at least a portion of the network traffic ingress/egress management circuitry 308 and the application layer packet translation circuitry 310 may form a portion of the communication circuitry 210, or more particularly of the MC 212. However, it should be appreciated that, in other embodiments, one or more functions of the network traffic ingress/egress management circuitry 308 and the application layer packet translation circuitry 310 as described herein may form a portion of one or more of the compute engine 200, the I/O subsystem 206, the communication circuitry 210, and/or other components of the network computing device 106. Further, in some embodiments, one or more of the components of the environment 300 may be embodied as virtualized hardware components or emulated architecture, which may be established and maintained by the compute engine 200, the communication circuitry 210, and/or other components of the network computing device 106. It should be appreciated that the network computing device 106 may include other components, sub-components, modules, sub-modules, logic, sub-logic, and/or devices commonly found in a computing device, which are not illustrated in FIG. 3 for clarity of the description.

In the illustrative environment 300, the network computing device 106 additionally includes policy data 302, network function data 304, and network packet data 306, each of which may be accessed by the various components and/or sub-components of the network computing device 106. Further, each of the policy data 302, the network function data 304, and the network packet data 306 may be accessed by the various components of the network computing device 106. Additionally, it should be appreciated that in some embodiments the data stored in, or otherwise represented by, each of the policy data 302, the network function data 304, and the network packet data 306 may not be mutually exclusive relative to each other. For example, in some implementations, data stored in the policy data 302 may also be stored as a portion of one or more of the network function data 304 and/or the network packet data 306, or vice versa. As such, although the various data utilized by the network computing device 106 is described herein as particular discrete data, such data may be combined, aggregated, and/or otherwise form portions of a single or multiple data sets, including duplicative copies, in other embodiments.

The network traffic ingress/egress manager 308, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 308 is configured to facilitate inbound network communications (e.g., network traffic, network packets, network flows, etc.) to the network computing device 106. Accordingly, the network traffic ingress/egress manager 308 is configured to manage (e.g., create, modify, delete, etc.) connections to physical and virtual network ports (i.e., virtual network interfaces) of the network computing device 106 (e.g., via the communication circuitry 210), as well as the ingress buffers/queues associated therewith. Additionally, the network traffic ingress/egress manager 308 is configured to facilitate outbound network communications (e.g., network traffic, network packet streams, network flows, etc.) from the network computing device 106. To do so, the network traffic ingress/egress manager 308 is configured to manage (e.g., create, modify, delete, etc.) connections to physical and virtual network ports/interfaces of the network computing device 106 (e.g., via the communication circuitry 210), as well as the egress buffers/queues associated therewith.

The application layer packet translator 310, which may be embodied as hardware, firmware, software, virtualized hardware, emulated architecture, and/or a combination thereof as discussed above, is configured to translate received network packets, at the application layer, between an API-based, cloud-ready collection of VNF services and a packet-switched network (e.g., the telecommunications network 104 or the cloud network 108 of FIG. 1) from which services of a VNF vendor originate. In some embodiments, the application layer packet translator 310 may be embodied as a network function operating as a proxy of a VNF services network (see, e.g., the VNF services network 606 of FIG. 6) of microservices as presented to a telecommunications network (e.g., the telecommunications network 104 of FIG. 1). It should be appreciated that, in other embodiments the VNF services network may be comprised of one or more functions (i.e., functions-as-a-service (FaaS)) as opposed to microservices.

In other embodiments, the application layer packet translator 310 may be embodied as a network function operating as a proxy of a telecommunications network (e.g., the telecommunications network 104 of FIG. 1) as presented to a VNF services network (see, e.g., the VNF services network 606 of FIG. 6) of microservices. In other words, in deployment, the application layer packet translator 310 will be connected to both sides of the telecommunications network, and use scalable microservices (e.g., running in the cloud network 108 of FIG. 1) to perform network functions. Accordingly, the encapsulation/decapsulation functions as described herein allows various VNF instances that are called in the appropriate order (i.e., the packet flow becomes a call-chain flow).

To translate the received network packets, the illustrative application layer packet translator 310 includes a network packet classifier 312, a service policy identifier 314, a network function determiner 316, a packet data encapsulator 318, an RPC API invoker 320, and an RPC response call translator 322. It should be appreciated that each of the network packet classifier 312, the service policy identifier 314, the network function determiner 316, the packet data encapsulator 318, the RPC API invoker 320, and the RPC response call translator 322 of the illustrative application layer packet translator 310 may be separately embodied as hardware, firmware, software, virtualized hardware, emulated architecture, and/or a combination thereof.

The network packet classifier 312 is configured to read and classify the received network packets. To do so, the network packet classifier 312 is configured to read (e.g., using Intel® Data Plane Development Kit (DPDK), various hardware offload capabilities of the NIC 212, etc.) at least a portion of the header and/or payload of the network packet, identify a flow based on the read portion, and classify the network packet as a function of the identified flow. The service policy identifier 314 is configured to identify a service policy associated with the flow classification (e.g., as determined by the network packet classifier 312) that is usable to identify which VNF instances are to be invoked for the received packet. To do so, the service policy identifier 314 may be configured to perform a lookup operation in a flow database as a function of the flow classifier. It should be appreciated that, in some embodiments, the service policy may be a dynamic policy, such that the service policy can be changed from time to time, depending on instruction received from an administrator, available resources, a detected condition, etc. The service policy may be stored in the policy data 302, in some embodiments.

The network function determiner 316 is configured to determine which VNF(s) are to be invoked for the received packet based on a previously identified service policy (e.g., as identified by the service policy identifier 314), as well as a corresponding location of each VNF. As described previously, each VNF has a corresponding URI which is usable to make RPC calls. Accordingly, the network function determiner 316 is configured to determine which URI(s) correspond to the determined VNF(s). The packet data encapsulator 318 is configured to encapsulate at least a portion of the received network packets at the application layer (i.e., layer seven of the Open System Interconnection (OSI) model). To do so, the packet data encapsulator 318 is configured to encapsulate at least a portion of the received network packets as one or more parameters of an RPC.

The RPC API invoker 320 is configured to invoke the determined VNF instances directly through an API call (e.g., a representational state transfer (REST) API), based a corresponding RPC. Accordingly, the RPC API invoker 320 can implement service chaining with network function calls in an imperative way. In other words, some component (e.g., the network traffic ingress/egress manager 308) receives network packets (e.g., via a network interface of the NIC 212 of FIG. 2) and the RPC API invoker 320 is configured to make a call or a sequence of calls to the VNF(s), such as may be determined by the network function determiner 316. The RPC response call translator 322 is configured to translate responses received from the VNF(s) into network packet trains that are appropriate for transmission to a target computing device (e.g., the endpoint computing device from which the network packet was received, another network computing device 106, a cloud compute/storage device 110, etc.).

Figure 4A:
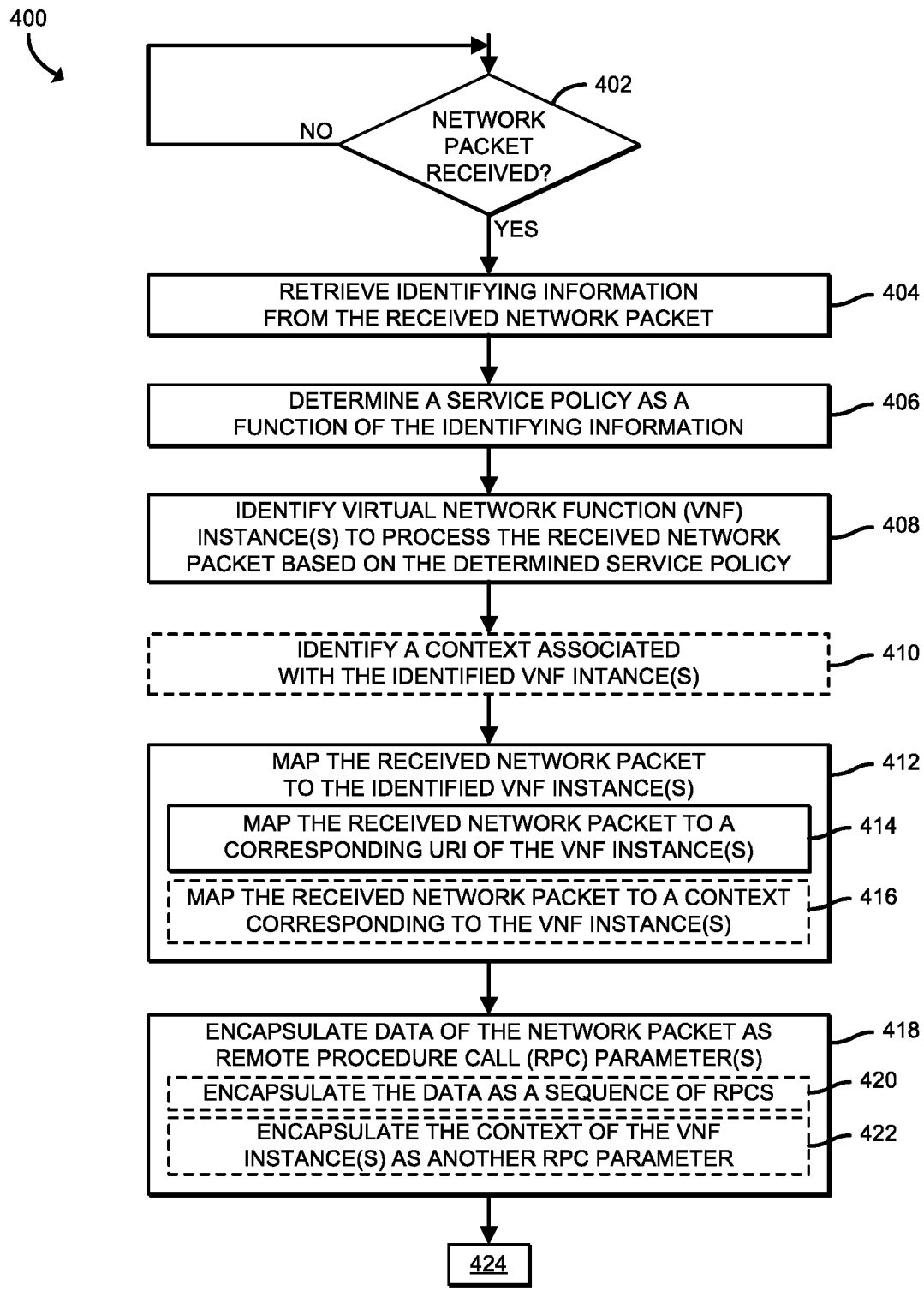
FIGS. 4A and 4B are a simplified flow diagram of at least one embodiment of a method for processing a network packet between cloud and telecommunications networks that may be executed by the network computing device of FIGS. 1-3.
Figure 4B:
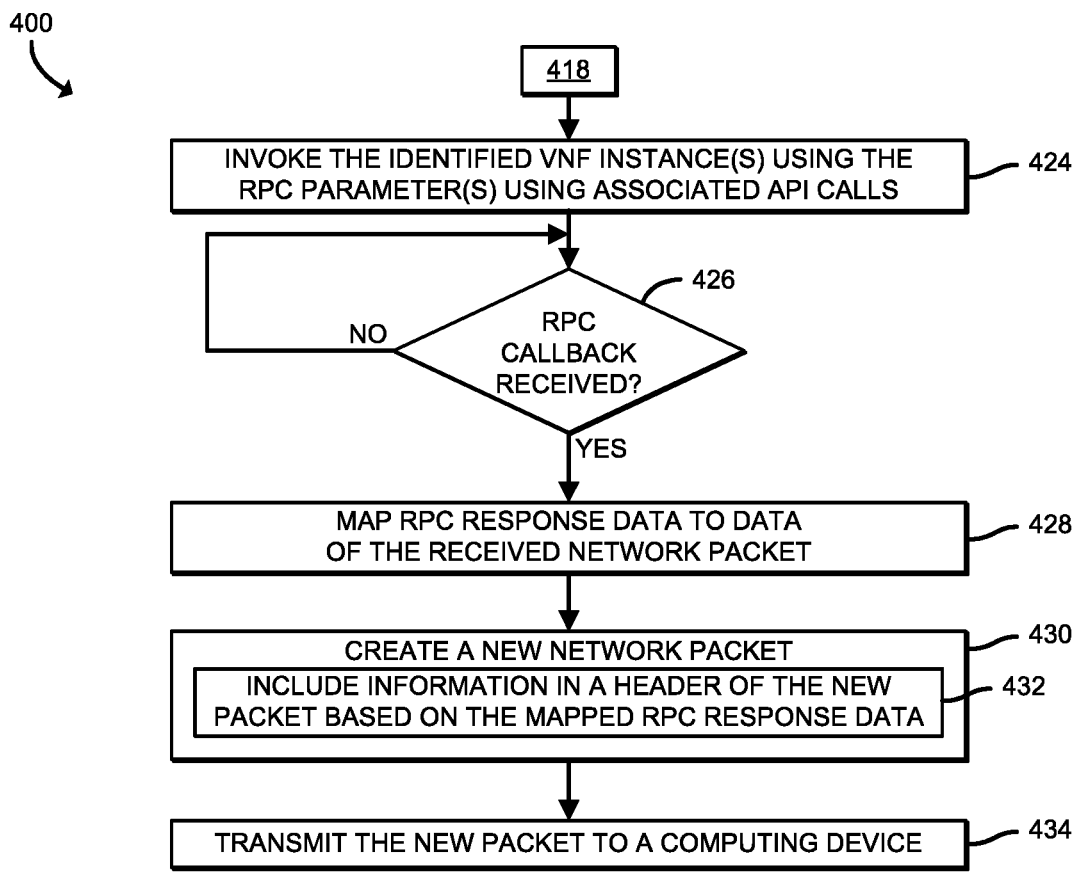

Referring now to FIGS. 4A and 4B, a method 400 for processing a network packet between telecommunication and cloud networks (e.g., between the telecom network 104 and the cloud network 108 of FIG. 1) is shown which may be executed by a network computing device (e.g., the network computing device 106 of FIGS. 1-3), or more particularly by an application layer packet translator of the network computing device 106 (e.g., the application layer packet translator 310 of FIG. 3). The method 400 begins with block 402, in which the application layer packet translator 310 determines whether a network packet has been received (e.g., from the endpoint computing device 102 of FIG. 1). If so, the method 400 advances to block 404.

In block 404, the application layer packet translator 310 retrieves identifying information from the received network packet. The identifying information may include any type of data usable to identify a flow of the network packet, such as source identifying information (e.g., an Internet Protocol (IP) address, a port number, a media access control (MAC) address, etc., of the computing device from which the network packet was received), target identifying information (e.g., an IP address, a port number, a MAC address, etc., of the computing device for which the network packet is to be transmitted), payload data type identifying information (e.g., data, voice, text, video, audio, etc.), workload type (e.g., streaming, file transfer, data backup, etc.), etc.

In block 406, the application layer packet translator 310 determines a service policy as a function of the identifying information (e.g., as a function of the identified flow corresponding to the received network packet). The service policy includes any type of information usable to identify one or more VNF instances which are to be invoked (e.g., serially, in parallel, etc.) to perform some level of processing on the received network packet. As described previously, each of the VNF instances perform some type of processing service on the network packet, including firewall services, NAT services, load-balancing services, DPI services, TCP optimization services, etc.

In block 408, the application layer packet translator 310 identifies one or more VNF instances to process at least a portion of the received network packet based on the VNF instance(s) as required under the determined service policy. As described previously, the service policy may be dynamic (i.e., change at any given time based on certain conditions, requirements, etc.). Accordingly, it should be appreciated that different network packets of the same flow, or same flow type, may require different VNF instance(s). In block 410, the application layer packet translator 310 may identify a context associated with the identified VNF instance(s).

In block 412, the application layer packet translator 310 maps the received network packet to the identified VNF instance(s). For example, in some embodiments, the application layer packet translator 310 may map the network packet to the identified VNF instance(s) in a forwarding table (i.e., an application layer-level forwarding table). As also described previously, each VNF instance has a corresponding URI to make RPCs. Accordingly, as shown in block 414, the application layer packet translator 310 may map the received network packet to each corresponding URI of each identified VNF instance. Additionally, in some embodiments, in block 416, the application layer packet translator 310 may map the received network packet to a context and/or configuration corresponding to each identified VNF instance. For example, in some embodiments, a VNF instance may be the same for different service chains, but each service chain may have a different configuration of the VNF instance. Accordingly, in such embodiments, the context/configuration of a VNF instance may be passed to the VNF instance. As such, memory can be saved, as a single VNF instance can essentially be reconfigured and reused, rather than creating multiple VNF instances to perform generally the same function.

In block 418, the application layer packet translator 310 encapsulates at least a portion of the data of the received network packet (e.g., at least a portion of the header and/or payload of the network packet) as one or more parameters of one or more RPCs. In some embodiments, in block 420, the application layer packet translator 310 may encapsulate at least a portion of the data of the received network packet as parameter(s) of a sequence of RPCs (i.e., a service chain of VNF instances). Additionally, in some embodiments, in block 422, the application layer packet translator 310 may encapsulate the identified context of the VNF instance as another parameter of the RPC to that VNF instance.

In block 424, as shown in FIG. 4B, the application layer packet translator 310 invokes the one or more identified VNF instances with the RPC parameters using corresponding API calls. In block 426, the application layer packet translator 310 determines whether an RPC callback has been received indicating that the processing by the one or more VNF instances has completed. As described previously, in alternative embodiments, the RPC may return processed data of the processed network packet (i.e., as opposed to the RPC callback). If the RPC callback has been received, the method 400 advances to block 428, in which the application layer packet translator 310 maps the RPC response data received with the RPC callback to data of the received network packet.

In block 430, the application layer packet translator 310 creates a new network packet. Additionally, in block 432, the application layer packet translator 310 includes information in the header of the new network packet based on the mapped RPC response data. It should be appreciated that, in some embodiments, as a function of the RPC response received, the application layer packet translator 310 may perform another action, such as dropping the packet, notifying the sender of the result, etc. In block 434, the application layer packet translator 310 transmits the new packet to a target computing device (e.g., the endpoint computing device from which the network packet was received, another network computing device 106, a cloud compute/storage device 110, etc.). It should be appreciated that the target computing device may be determined as a function of the location of the target computing device relative to the network computing device 106 (e.g., same geographical location, same data center, etc.).

Figure 5:
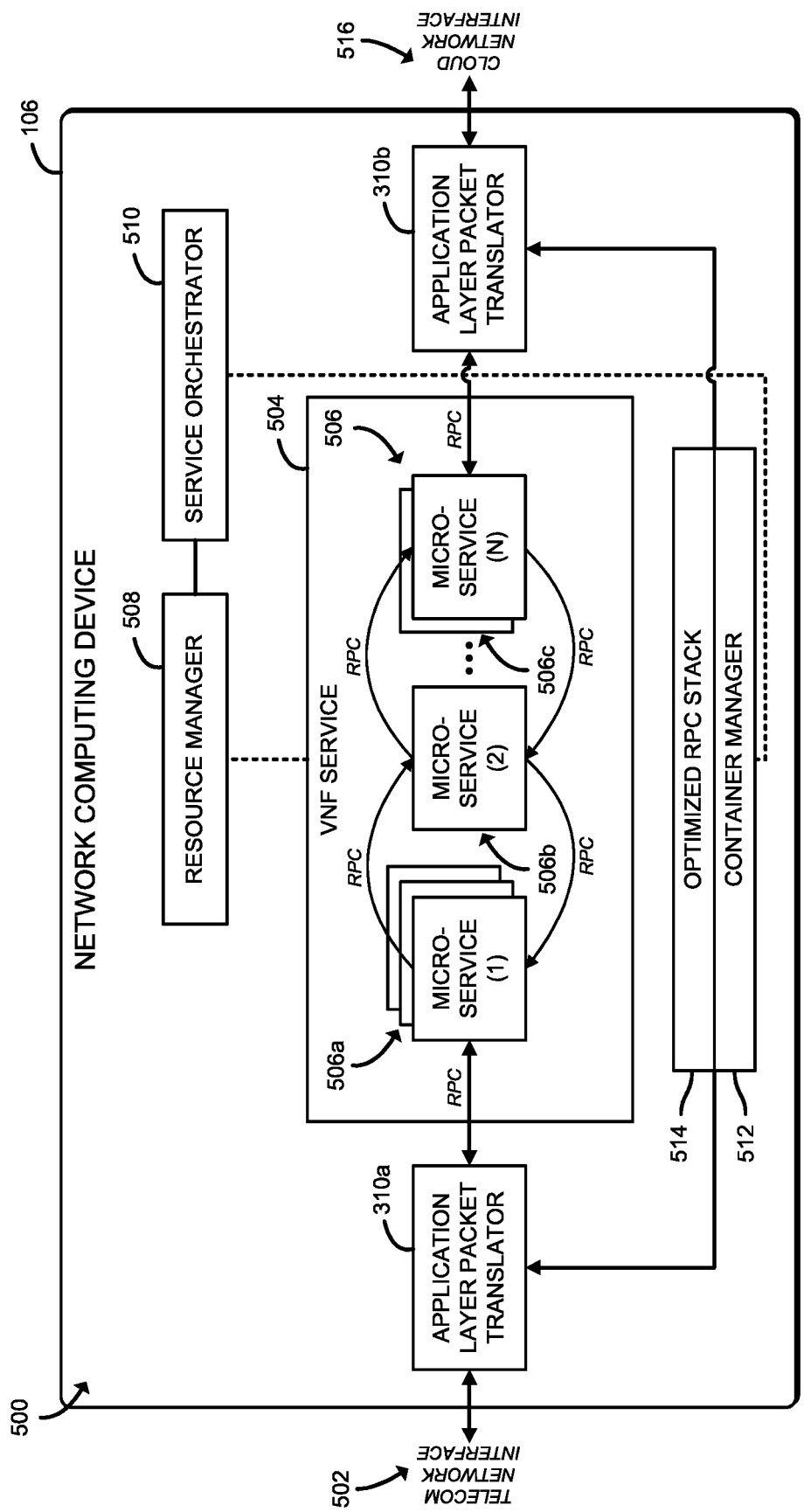
FIG. 5 is a simplified block diagram of at least one embodiment of an environment for running VNF instances implemented as microservices on the network computing device of FIGS. 1-3.

In some embodiments, a single application layer packet translator 310 may be used to perform the invocation and receive the callback (i.e., the entirety of the method 400); whereas in other embodiments, two application layer packet translators 310 may be used (see, e.g., the environment 500 of FIG. 5). In such two application layer packet translator 310 embodiments, one application layer packet translator 310 may receive the network packet and perform the invocation (i.e., blocks 402-418 of the method 400), while another application layer packet translator 310 receives the RPC callback and creates/transmits a network packet in response to having received the RPC callback (i.e., blocks 420-428 of the method 400).

Referring now to FIG. 5, an environment 500 illustrates running VNF instances implemented as microservices on the network computing device 106. As described previously, as illustratively shown as microservices, each VNF instance may be implemented as a function (e.g., a function-as-a-service (FaaS)), in other embodiments. The illustrative environment 500 includes a first application layer packet translator 310, designated as application layer packet translator 310a, which is communicatively coupled to a telecommunications network interface, and a second application layer packet translator 310, designated as application layer packet translator 310b, which is communicatively coupled to a cloud network interface 516. It should be appreciated that, while illustratively shown as residing on the same network computing device 106 (e.g., to minimize inter-network computing device 106 communications and, therefore, realizing efficiency and performance benefits), one or more of the microservices 506 and/or the application layer packet translators 310a, 310b may reside on another network computing device 106. The one or more microservices are illustrative shown as a first set of microservices 506 designated as microservices (1) 506a, a second set of microservices 506 designated as microservices (2) 506b, and a third set of microservices 506 designated as microservices (N) 506c (e.g., in which "N" represents the Nth set of microservices 506 and N is a positive integer).

The illustrative environment 500 additionally includes a resource manager 508, a service orchestrator 510, and a container manager 512. The resource manager 508 is configured to monitor and allocate resources of the VNF instances. It should be appreciated that, since each VNF is self-contained, the VNF instances can be run on different cores almost independently. The service orchestrator 510 is configured to orchestrate the VNF services (e.g., the VNF service 504), such that the service orchestrator 510 can hide details of the network connection, while the VNF instances maintain a simpler RPC interface. To do so, the APIs supported by the VNF instances can be extended with a method to create service flows (i.e., instructions to make a call to a subsequent VNF instead of responding to the request with modified network packet data).

Further, as a result of the application layer encapsulation, the VNF instances can be implemented as microservices, or a sequence of microservices (e.g., the sequence of microservices 506), on an existing infrastructure, such as Kubernetes, including existing public cloud infrastructures. However, it should be appreciated that an efficient implementation may require a specific software stack to be used. As illustratively shown, an optimized RPC stack 514, such as a vector packet processor (VPP), depending on the embodiment, may be used in the role of a virtual switch (vSwitch). Further, a TCP stack feature may be employed by the TCP protocol, which can replace connections between processes on the same host with a dedicated shared memory buffer, such as may be configured when a connection is established. The container manager 512 is configured to setup and manage the VNF services 504 in embodiments in which the VNF services 504 are being run in containers. It should be appreciated that, while a dedicated virtual NIC (vNIC) may be required for each connection in implementations in which virtual machines (VMs) are used, as opposed to containers.

In use, the application layer packet translator 310a receives incoming network packets (e.g., via the telecom network interface 502) from a source computing device (e.g., the endpoint computing device 102 of FIG. 1). It should be appreciated that the application layer packet translator 310a is configured to receive the network packets using line rate efficient mechanisms, such as DPDK or PF_RING™. The application layer packet translator 310a identifies the VNF service flow in accordance with the corresponding service policy, which as described previously can associate specific network packets to a sequence of function calls (e.g., similar to the function of a classifier in service function chains (SFCs)).

Additionally, the service policy may provide configuration and context information as well. Accordingly, in such embodiments in which the configuration and context can be passed to the VNF instances along with the network packet data, the same VNF can be used in different VNF service chains with different configurations. Depending on the embodiment, the context and configuration may be passed to the VNF instance directly, for example, in an embodiment in which the service chain serves a single tenant and the size of the context and configuration does not consume much overhead such that inefficiencies may be realized. In other embodiments, the VNF may be passed an identifier (e.g., a key), which identifies a database or other data from which the context and configuration (e.g., based on the service chain) can be extracted. It should be appreciated that such databases can be implemented as high-performance in-memory distributed databases with low latency access using framework provided APIs.

Unlike present technologies the application layer packet translator 310a is configured to invoke the one or more VNF instances of the identified VNF service with the data of the received network packet encapsulated as RPC parameters of API calls, such that the service chaining with network function calls can be implemented in an imperative way (e.g., via a sequence of calls to network functions or microservices thereof). As such, switching overhead can be replaced by function calls. It should be appreciated that the VNF instances can be extended with configuration and context, such that the same function can be used in different service chains with different configurations. In some embodiments, the application layer packet translator 310 may maintain a flow database which defines a packet matching rule with the associated URI for each RPC.

Upon completion of the network packet processing across the microservice chain of the VNF, the RPC output is received at the application layer packet translator 310b from translation from the RPC response to one or more network packets formatted for transmission (e.g., via the cloud network interface 516) to a target computing device (e.g., the cloud compute/storage device 110 of FIG. 1), such as by using use DPDK and/or one or more hardware offload features. To do so, the application layer packet translator 310b is configured to create the one or more network packets for transmission and adds specific headers and/or data to the created network packets consistent with the results received from the VNF service(s).

In some embodiments, the VNF instances may be deployed using a function-as-a-service (FaaS) approach (i.e., when a network function is only activated for a period of time), or more particularly a network function as a service approach. In such embodiments, it should be appreciated that the VNF instances are implemented in a compiled language to achieve high performance, and each VNF instance can be compiled with the use of the supporting functions/run-time as a shared object or plugin. Accordingly, various techniques can be used as security precautions, including security by trust (e.g., use signed modules, a security manifest, etc.), hardware isolation methods (e.g., stack pivoting, page protection, secure enclaves, etc.), and/or system-level isolation (e.g., the loading of functions in a separate namespace, a dedicated container or VM, etc.).

In some embodiments, VNF instances in shared objects can be wrapped using a secure RPC mechanism (e.g., gRPC) and executed as separate, isolated processes (i.e., executing as a temporal microservice, existing only for the lifetime of the VNF instance). Alternatively, if the VNF instances are provided as source code (e.g., open source, shared source), compiler and static verifiers can be used to ensure only the allowed functionality is accessible. Irrespective of the VNF implementation, VNF instances deployed using the FaaS approach can allow for the avoidance of data transfer completely (i.e., by transforming network packet data in place, in a "run to completion" model), not just switching overhead.

Figure 6:
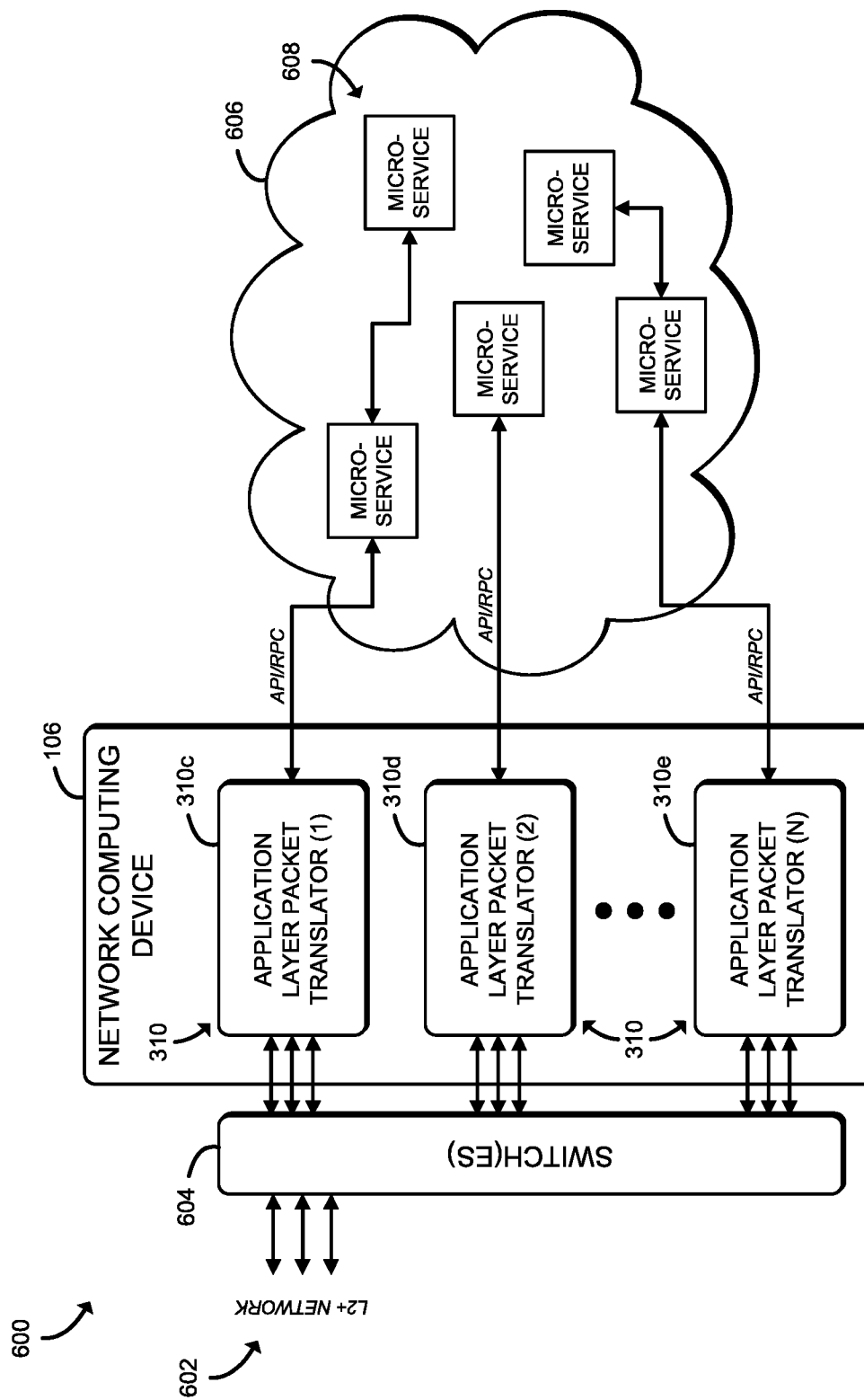
FIG. 6 is a simplified block diagram of at least one other embodiment of a system for network packet processing between cloud and telecommunication networks that includes the network computing device of FIGS. 1-3 and 5 illustratively coupled to a virtual network function (VNF) services network of application programming interface (API)/remote procedure call (RPC) based microservices.

Referring now to FIG. 6, an illustrative system 600 for network packet processing between an L2+ network 602 (i.e., a layer 2/data link layer, a layer 3/network layer, etc.) and a VNF services network 606, or cloud, of scalable microservices 608 (i.e., a collection of API-based, cloud-ready VNF services) running therein to perform auto-scalable and elastic VNF service deployment in clouds that achieves line rates required in latency sensitive architectures. It should be appreciated that the L2+ network 602 may be embodied as any packet switching network that needs to consume services (e.g., the telecommunications network 104 of FIG. 1). The system 600 includes one or more switches 604 (e.g., spine or leaf switch(es)) communicatively coupled to the network computing device 106 on which multiple application layer packet translators 310 reside.

The illustrative application layer packet translators 310 include a first application layer packet translator 310 designated as application layer packet translator (1) 310c, a second application layer packet translator 310 designated as application layer packet translator (2) 310d, and a third application layer packet translator 310 designated as application layer packet translator (N) 310e (N) (e.g., in which "N" represents the Nth application layer packet translator 310 and N is a positive integer). While the application layer packet translators 310 are illustratively shown as residing on the same network computing device 106, it should be appreciated that one or more of the application layer packet translators 310 may be distributed across multiple network computing devices 106 in other embodiments.

EXAMPLES

Illustrative examples of the technologies disclosed herein are provided below. An embodiment of the technologies may include any one or more, and any combination of, the examples described below.

Example 1 includes a network computing device for network packet processing between cloud and telecommunications networks, the network computing device comprising a compute engine; and communication circuitry to receive, by a first application layer packet translator of the communication circuitry, a network packet from a source computing device via a first network; identify, by the first application layer packet translator, a virtual network function (VNF) instance based on the received network packet; perform, by the first application layer packet translator, an application layer encapsulation of at least a portion of data of the received network packet as a parameter of a remote procedure call (RPC) associated with the VNF instance; invoke, by the first application layer packet translator, the identified VNF instance using an API call corresponding to the RPC that includes the RPC parameter; receive, by the invoked VNF instance, an RPC call response to a second application layer packet translator, wherein the RPC call response indicates the invoked VNF instance has processed at least a portion of the encapsulated data; generate, by the second application layer packet translator and subsequent to having received the RPC call response, a new network packet as a function of the RPC call response; and transmit, by the second application layer packet translator, the new network packet to a target computing device via a second network.

Example 2 includes the subject matter of Example 1, and wherein to identify the VNF instance based on the received network packet comprises to (i) determine a flow of the network packet, (ii) compare the determined flow against a known flow of a service policy to determine a matching flow, and (iii) identify the VNF instance as a function of a VNF identifier associated with the matching flow.

Example 3 includes the subject matter of any of Examples 1 and 2, and wherein the VNF identifier comprises a uniform resource identifier (URI) and wherein to invoke the identified VNF instance using the API call comprises to invoke the identified VNF instance as a function of the URI.

Example 4 includes the subject matter of any of Examples 1-3, and wherein to perform the application layer encapsulation of at least a portion of data of the received network packet as the parameter of the RPC call comprises to perform the application layer encapsulation of at least a portion of data of the received network packet as a parameter for each of a sequence of a plurality of RPCs.

Example 5 includes the subject matter of any of Examples 1-4, and wherein to identify the VNF instance comprises to identify a VNF service that includes a plurality of microservices or a plurality of functions.

Example 6 includes the subject matter of any of Examples 1-5, and wherein the RPC call response indicates the invoked VNF instance has processed at least a portion of the encapsulated data via the plurality of microservices or the plurality of functions of the VNF service.

Example 7 includes the subject matter of any of Examples 1-6, and wherein to generate the new network packet as a function of the RPC call response comprises to include data associated with the RPC call response to at least one of a header and a payload of the new network packet.

Example 8 includes the subject matter of any of Examples 1-7, and wherein the first network comprises a telecommunications network and the second network comprises a cloud network.

Example 9 includes the subject matter of any of Examples 1-8, and wherein the communication circuitry is further to identify, by the first application layer packet translator, a context for the VNF instance based on at least a portion of the received network packet, and wherein to perform the application layer encapsulation of the at least a portion of data of the received network packet as the parameter of the RPC associated with the VNF instance includes to perform the application layer encapsulation of the context for the VNF instance as another parameter of the RPC call.

Example 10 includes one or more machine-readable storage media comprising a plurality of instructions stored thereon that, in response to being executed, cause a network computing device to receive, by a first application layer packet translator of the network computing device, a network packet from a source computing device via a first network; identify, by the first application layer packet translator, a virtual network function (VNF) instance based on the received network packet; perform, by the first application layer packet translator, an application layer encapsulation of at least a portion of data of the received network packet as a parameter of a remote procedure call (RPC) associated with the VNF instance; invoke, by the first application layer packet translator, the identified VNF instance using an API call corresponding to the RPC that includes the RPC parameter; receive, by the invoked VNF instance, an RPC call response to a second application layer packet translator, wherein the RPC call response indicates the invoked VNF instance has processed at least a portion of the encapsulated data; generate, by the second application layer packet translator and subsequent to having received the RPC call response, a new network packet as a function of the RPC call response; and transmit, by the second application layer packet translator, the new network packet to a target computing device via a second network.

Example 11 includes the subject matter of Example 10, and wherein to identify the VNF instance based on the received network packet comprises to (i) determine a flow of the network packet, (ii) compare the determined flow against a known flow of a service policy to determine a matching flow, and (iii) identify the VNF instance as a function of a VNF identifier associated with the matching flow.

Example 12 includes the subject matter of any of Examples 10 and 11, and wherein the VNF identifier comprises a uniform resource identifier (URI) and wherein to invoke the identified VNF instance using the API call comprises to invoke the identified VNF instance as a function of the URI.

Example 13 includes the subject matter of any of Examples 10-12, and wherein to perform the application layer encapsulation of at least a portion of data of the received network packet as the parameter of the RPC call comprises to perform the application layer encapsulation of at least a portion of data of the received network packet as a parameter for each of a sequence of a plurality of RPCs.

Example 14 includes the subject matter of any of Examples 10-13, and wherein to identify the VNF instance comprises to identify a VNF service that includes a plurality of microservices or a plurality of functions.

Example 15 includes the subject matter of any of Examples 10-14, and wherein the RPC call response indicates the invoked VNF instance has processed at least a portion of the encapsulated data via the plurality of microservices or the plurality of functions of the VNF service.

Example 16 includes the subject matter of any of Examples 10-15, and wherein to generate the new network packet as a function of the RPC call response comprises to include data associated with the RPC call response to at least one of a header and a payload of the new network packet.

Example 17 includes the subject matter of any of Examples 10-16, and wherein the first network comprises a telecommunications network and the second network comprises a cloud network.

Example 18 includes the subject matter of any of Examples 10-17, and wherein the plurality of instructions further cause the network computing device to identify, by the first application layer packet translator, a context for the VNF instance based on at least a portion of the received network packet, and wherein to perform the application layer encapsulation of the at least a portion of data of the received network packet as the parameter of the RPC associated with the VNF instance includes to perform the application layer encapsulation of the context for the VNF instance as another parameter of the RPC call.

Example 19 includes a network computing device for network packet processing between cloud and telecommunications networks, the network computing device comprising means for receiving, by a first application layer packet translator of the network computing device, a network packet from a source computing device via a first network; means for identifying, by the first application layer packet translator, a virtual network function (VNF) instance based on the received network packet; means for performing, by the first application layer packet translator, an application layer encapsulation of at least a portion of data of the received network packet as a parameter of a remote procedure call (RPC) associated with the VNF instance; means for invoking, by the first application layer packet translator, the identified VNF instance using an API call corresponding to the RPC that includes the RPC parameter; means for receiving, by the invoked VNF instance, an RPC call response to a second application layer packet translator, wherein the RPC call response indicates the invoked VNF instance has processed at least a portion of the encapsulated data; means for generating, by the second application layer packet translator and subsequent to having received the RPC call response, a new network packet as a function of the RPC call response; and circuitry for transmitting, by the second application layer packet translator, the new network packet to a target computing device via a second network.

Example 20 includes the subject matter of Example 19, and wherein the means for identifying the VNF instance based on the received network packet comprises means for (i) determining a flow of the network packet, (ii) comparing the determined flow against a known flow of a service policy to determine a matching flow, and (iii) identifying the VNF instance as a function of a VNF identifier associated with the matching flow.

Example 21 includes the subject matter of any of Examples 19 and 20, and wherein the VNF identifier comprises a uniform resource identifier (URI) and wherein the means for invoking the identified VNF instance using the API call comprises means for invoking the identified VNF instance as a function of the URI.

Example 22 includes the subject matter of any of Examples 19-21, and wherein the means for performing the application layer encapsulation of at least a portion of data of the received network packet as the parameter of the RPC call comprises means for performing the application layer encapsulation of at least a portion of data of the received network packet as a parameter for each of a sequence of a plurality of RPCs.

Example 23 includes the subject matter of any of Examples 19-22, and wherein the means for identifying the VNF instance comprises means for identifying a VNF service that includes a plurality of microservices or a plurality of functions.

Example 24 includes the subject matter of any of Examples 19-23, and wherein the means for generating the new network packet as a function of the RPC call response comprises means for including data associated with the RPC call response to at least one of a header and a payload of the new network packet.

Example 25 includes the subject matter of any of Examples 19-24, and further including means for identifying, by the first application layer packet translator, a context for the VNF instance based on at least a portion of the received network packet, and wherein the means for performing the application layer encapsulation of the at least a portion of data of the received network packet as the parameter of the RPC associated with the VNF instance includes means for performing the application layer encapsulation of the context for the VNF instance as another parameter of the RPC call.

The invention claimed is:

1. A network computing device comprising:
a compute engine; and
communication circuitry to:
  receive a network packet from a source computing device via a first network;
  identify a virtual network function (VNF) instance based on the received network packet;
  perform an application layer encapsulation of at least a portion of data of the received network packet as a parameter of a remote procedure call (RPC) associated with the VNF instance;
  invoke the identified VNF instance using an application programming interface (API) call corresponding to the RPC that includes the RPC parameter;
  receive an RPC call response from the invoked VNF instance, wherein the RPC call response indicates the invoked VNF instance has processed at least a portion of the encapsulated data;
  generate, subsequent to having received the RPC call response, a new network packet as a function of the RPC call response; and
  transmit the new network packet to a target computing device via a second network.

2. The network computing device of claim 1, wherein to identify the VNF instance based on the received network packet comprises to (i) determine a flow of the network packet, (ii) compare the determined flow against a known flow of a service policy to determine a matching flow, and (iii) identify the VNF instance as a function of a VNF identifier associated with the matching flow.

3. The network computing device of claim 2, wherein the VNF identifier comprises a uniform resource identifier (URI) and wherein to invoke the identified VNF instance using the API call comprises to invoke the identified VNF instance as a function of the URI.

4. The network computing device of claim 1, wherein to perform the application layer encapsulation of at least a portion of data of the received network packet as the parameter of the RPC call comprises to perform the application layer encapsulation of at least a portion of data of the received network packet as a parameter for each of a sequence of a plurality of RPCs.

5. The network computing device of claim 1, wherein to identify the VNF instance comprises to identify a VNF service that includes a plurality of microservices or a plurality of functions.

6. The network computing device of claim 5, wherein the RPC call response indicates the invoked VNF instance has processed at least a portion of the encapsulated data via the plurality of microservices or the plurality of functions of the VNF service.

7. The network computing device of claim 1, wherein to generate the new network packet as a function of the RPC call response comprises to include data associated with the RPC call response to at least one of a header and a payload of the new network packet.

8. The network computing device of claim 1, wherein the first network comprises a telecommunications network and the second network comprises a cloud network.

9. The network computing device of claim 1, wherein the communication circuitry is further to identify a context for the VNF instance based on at least a portion of the received network packet, and wherein to perform the application layer encapsulation of the at least a portion of data of the received network packet as the parameter of the RPC associated with the VNF instance includes to perform the application layer encapsulation of the context for the VNF instance as another parameter of the RPC call.

10. One or more non-transitory machine-readable storage media comprising a plurality of instructions stored thereon that, in response to being executed by communication circuitry of a network computing device, cause the communication circuitry to:
receive a network packet from a source computing device via a first network;
identify a virtual network function (VNF) instance based on the received network packet;
perform an application layer encapsulation of at least a portion of data of the received network packet as a parameter of a remote procedure call (RPC) associated with the VNF instance;
invoke the identified VNF instance using an application programming interface (API) call corresponding to the RPC that includes the RPC parameter;
receive an RPC call response from the invoked VNF instance, wherein the RPC call response indicates the invoked VNF instance has processed at least a portion of the encapsulated data;
generate, subsequent to having received the RPC call response, a new network packet as a function of the RPC call response; and
transmit the new network packet to a target computing device via a second network.

11. The one or more non-transitory machine-readable storage media of claim 10, wherein to identify the VNF instance based on the received network packet comprises to (i) determine a flow of the network packet, (ii) compare the determined flow against a known flow of a service policy to determine a matching flow, and (iii) identify the VNF instance as a function of a VNF identifier associated with the matching flow.

12. The one or more non-transitory machine-readable storage media of claim 11, wherein the VNF identifier comprises a uniform resource identifier (URI) and wherein to invoke the identified VNF instance using the API call comprises to invoke the identified VNF instance as a function of the URI.

13. The one or more non-transitory machine-readable storage media of claim 10, wherein to perform the application layer encapsulation of at least a portion of data of the received network packet as the parameter of the RPC call comprises to perform the application layer encapsulation of at least a portion of data of the received network packet as a parameter for each of a sequence of a plurality of RPCs.

14. The one or more non-transitory machine-readable storage media of claim 10, wherein to identify the VNF instance comprises to identify a VNF service that includes a plurality of microservices or a plurality of functions.

15. The one or more non-transitory machine-readable storage media of claim 14, wherein the RPC call response indicates the invoked VNF instance has processed at least a portion of the encapsulated data via the plurality of microservices or the plurality of functions of the VNF service.

16. The one or more non-transitory machine-readable storage media of claim 10, wherein to generate the new network packet as a function of the RPC call response comprises to include data associated with the RPC call response to at least one of a header and a payload of the new network packet.

17. The one or more non-transitory machine-readable storage media of claim 10, wherein the first network comprises a telecommunications network and the second network comprises a cloud network.

18. The one or more non-transitory machine-readable storage media of claim 10, wherein the plurality of instructions further cause the communication circuitry to identify a context for the VNF instance based on at least a portion of the received network packet, and wherein to perform the application layer encapsulation of the at least a portion of data of the received network packet as the parameter of the RPC associated with the VNF instance includes to perform the application layer encapsulation of the context for the VNF instance as another parameter of the RPC call.

19. Communication circuitry of a network computing device, the communication circuitry comprising:
means for receiving a network packet from a source computing device via a first network;
means for identifying a virtual network function (VNF) instance based on the received network packet;
means for performing an application layer encapsulation of at least a portion of data of the received network packet as a parameter of a remote procedure call (RPC) associated with the VNF instance;
means for invoking the identified VNF instance using an application programming interface (API) call corresponding to the RPC that includes the RPC parameter;
means for receiving an RPC call response from the invoked VNF instance, wherein the RPC call response indicates the invoked VNF instance has processed at least a portion of the encapsulated data;
means for generating, subsequent to having received the RPC call response, a new network packet as a function of the RPC call response; and circuitry for transmitting the new network packet to a target computing device via a second network.

20. The communication circuitry of claim 19, wherein the means for identifying the VNF instance based on the received network packet comprises means for (i) determining a flow of the network packet, (ii) comparing the determined flow against a known flow of a service policy to determine a matching flow, and (iii) identifying the VNF instance as a function of a VNF identifier associated with the matching flow.

21. The communication circuitry of claim 20, wherein the VNF identifier comprises a uniform resource identifier (URI) and wherein the means for invoking the identified VNF instance using the API call comprises means for invoking the identified VNF instance as a function of the URI.

22. The communication circuitry device of claim 19, wherein the means for performing the application layer encapsulation of at least a portion of data of the received network packet as the parameter of the RPC call comprises means for performing the application layer encapsulation of at least a portion of data of the received network packet as a parameter for each of a sequence of a plurality of RPCs.

23. The communication circuitry of claim 19, wherein the means for identifying the VNF instance comprises means for identifying a VNF service that includes a plurality of microservices or a plurality of functions.

24. The communication circuitry of claim 19, wherein the means for generating the new network packet as a function of the RPC call response comprises means for including data associated with the RPC call response to at least one of a header and a payload of the new network packet.

25. The communication circuitry of claim 19, further comprising means for identifying a context for the VNF instance based on at least a portion of the received network packet, and wherein the means for performing the application layer encapsulation of the at least a portion of data of the received network packet as the parameter of the RPC associated with the VNF instance includes means for performing the application layer encapsulation of the context for the VNF instance as another parameter of the RPC call.

* * * * *